United States Patent
Bae (10) Patent No.: US 8,941,361 B2
(45) Date of Patent: Jan. 27, 2015

(54) COMPUTER SYSTEM AND CONTROL METHOD THEREOF

(75) Inventor: Seung-min Bae, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 836 days.

(21) Appl. No.: 12/974,374

(22) Filed: Dec. 21, 2010

(65) Prior Publication Data

US 2011/0291609 A1    Dec. 1, 2011

(30) Foreign Application Priority Data

May 25, 2010    (KR) ........................ 10-2010-0048708

(51) Int. Cl.
*H02J 7/00* (2006.01)
*H02J 7/14* (2006.01)
*G06F 1/26* (2006.01)

(52) U.S. Cl.
CPC ............... *H02J 7/0054* (2013.01); *G06F 1/263* (2013.01); *H02J 7/0027* (2013.01); *G06F 1/266* (2013.01)
USPC ............ 320/137; 320/103; 320/138; 320/134

(58) Field of Classification Search
USPC ......... 320/103, 107, 138, 141, 143, 135, 137, 320/134, 148, 149, 155, 110, 114, 124; 439/668
See application file for complete search history.

(56) References Cited

U.S. PATENT DOCUMENTS

| | | | | |
|---|---|---|---|---|
| 6,345,364 B1 * | 2/2002 | Lee | ................................ | 713/324 |
| 6,774,604 B2 * | 8/2004 | Matsuda et al. | ............... | 320/110 |
| 7,508,161 B2 * | 3/2009 | Harada | ......................... | 320/103 |
| 7,852,046 B2 * | 12/2010 | Krah et al. | ..................... | 320/140 |
| 7,975,091 B2 * | 7/2011 | Uchida | ......................... | 710/313 |
| 8,106,630 B2 * | 1/2012 | Tupman et al. | ............... | 320/132 |
| 2004/0232879 A1 * | 11/2004 | Wang et al. | .................... | 320/103 |
| 2006/0035527 A1 | 2/2006 | Numano | | |
| 2010/0115147 A1 * | 5/2010 | Kim | ............................... | 710/14 |
| 2011/0047393 A1 * | 2/2011 | Tracy et al. | .................... | 713/300 |

FOREIGN PATENT DOCUMENTS

| | | |
|---|---|---|
| JP | 2006-053748 | 2/2006 |
| KR | 2003-0070915 | 9/2003 |

(Continued)

OTHER PUBLICATIONS

Linear Technology Corporation, USB Power Controller and Li-Ion Linear Charger with Low Loss Ideal Diode, 2005, pp. 1-28, LTC4066/LTC4066-1, Linear Technology Corporation, Milpitas, CA.

*Primary Examiner* — Edward Tso
*Assistant Examiner* — Alexis A Boateng
(74) *Attorney, Agent, or Firm* — Staas & Halsey LLP (57) ABSTRACT

A computer system to charge a rechargeable battery of an external device regardless of power on/off of the computer system when the external device having the rechargeable battery is connected, and a control method thereof. The computer system includes a connector having a terminal to which an external device is connected, a power supply to supply power to the connector, and a recognition signal generator to generate a predetermined recognition signal to initiate charging a rechargeable battery of the external device with power supplied from the power supply through the connector when the external device having the rechargeable battery is connected to the connector through the terminal. Thus, it is possible to charge the battery of the external device even when the computer system is powered off.

20 Claims, 4 Drawing Sheets

(56) References Cited

FOREIGN PATENT DOCUMENTS

| | | |
|---|---|---|
| KR | 10-0700532 | 3/2007 |
| KR | 10-0932481 | 12/2009 |
| WO | 02-065264 | 8/2002 |
| WO | WO 2009105113 A1 * | 8/2009 ............... G06F 1/26 |

* cited by examiner

COMPUTER SYSTEM AND CONTROL METHOD THEREOF

CROSS-REFERENCE TO RELATED APPLICATIONS

This application claims priority under 35 U.S.C. §119(a) from Korean Patent Application No. 10-2010-0048708, filed on May 25, 2010 in the Korean Intellectual Property Office, the disclosure of which is incorporated herein by reference in its entirety.

BACKGROUND

1. Field of the Invention

Apparatuses and methods consistent with the exemplary embodiments of the present general inventive concept relate to a computer system and a control method thereof, and more particularly, to a computer system to charge a rechargeable battery of an external device regardless of power on/off of the computer system when the external device having the rechargeable battery is connected, and a control method thereof.

2. Description of the Related Art

A portable device such as a cellular phone, a portable multimedia player (PMP), etc., which has a rechargeable battery, includes a circuit for distinguishing between a host device and a wall adapter in order to control a charging current. In this case, if the host device is powered off, the portable device cannot recognize it as a host device for charging and thus a battery of the portable device is not charged. For the same reason, the host device always supplies power to a connector, to which the portable device is connected, even when the host device is powered off, but the battery of the portable device is not charged.

SUMMARY

Accordingly, exemplary embodiments of the present general inventive concept provide a computer system to charge a rechargeable battery of an external device regardless of power on/off of the computer system when the external device having the rechargeable battery is connected, and a control method thereof.

Additional features and utilities of the present general inventive concept will be set forth in part in the description which follows and, in part, will be obvious from the description, or may be learned by practice of the present general inventive concept.

Exemplary embodiments of the present general inventive concept provide a computer system including a connector which includes a terminal to which an external device is connected, a power supply to supply power to the connector, and a recognition signal generator to generate a predetermined recognition signal to initiate charging a rechargeable battery of the external device with power supplied from the power supply through the connector when the external device having the rechargeable battery is connected to the connector through the terminal.

The computer system may further include a system unit, a switching unit to selectively connect the connector to one of the recognition signal generator and the system unit, and a controller to control the switching unit.

The controller may control the switching unit to electrically connect the connector with the recognition signal generator when the system unit is powered off.

The computer system may further include a data switching unit to control a connection between the connector and the system unit, where the controller can control the data switching unit to electrically disconnect the connector from the system unit when the system unit is powered off.

The connector may include a universal serial bus (USB) interface.

The terminal of the connector may include a data signal terminal to which the external device is connected to communicate a data signal with the system unit, and the recognition signal generator may be connected to the data signal terminal.

The computer system may further include a power supply controller to control the power supply to supply predetermined power to the connector even if the system unit is powered off.

The computer system may further include a battery unit to supply power to the connector, where the recognition signal generator generates a predetermined recognition signal to initiate a charge of the battery with power supplied from the battery unit when no external power is supplied to the power supply.

The computer system may further include a system unit, and a power supply controller to control the battery unit to supply predetermined power to the connector even when the system unit is powered off.

Exemplary embodiments of the present general inventive concept may also provide a method of controlling a computer system, the method including connecting an external device having a rechargeable battery through a connector, generating a predetermined recognition signal by a recognition signal generator to charge the battery with power supplied from a power supply through the connector, and initiating charging the battery according to the generated recognition signal.

The method may further include controlling a switching unit to selectively connect the connector with one of the recognition signal generator and the system unit.

The controlling the switching unit may include controlling the switching unit to electrically connect the connector with the recognition signal generator when the system unit is powered off.

The method may further include controlling a data switching unit to control connection between the connector and the system unit.

The controlling the data switching unit may include the data switching unit to electrically disconnect the connector from the system unit when the system unit is powered off.

The method may further include controlling the power supply to supply predetermined power to the connector even when the system unit is powered off.

The generating the recognition signal may include generating a predetermined recognition signal to initiate charging the battery with power supplied from the battery unit when no external power is supplied to the power supply.

The method may further include controlling the battery unit to supply predetermined power to the connector even when the system unit is powered off.

The connector may include a universal serial bus (USB) interface.

Exemplary embodiments of the present general inventive concept can also provide a computer system, including a connector to connect an external device to the computer system, and a switching unit to selectively connect a system unit of the computer system to communicate data with the external device, or a recognition signal generator of the computer system to generate a signal to initiate charging of a battery of the external device.

The computer system can include where the switching unit electrically disconnects the system unit from the connector so that data is not transmitted to between the system unit and the external device when the system unit is powered off, and electrically connects the system unit to the connector when the system unit is powered on and the external device is connected to the computer system.

The computer system can further include a power supply controller to supply power from a power supply or a battery unit to the connected external device when the system unit is powered off.

The computer system can include where the signal generated by the recognition signal generator is recognized by the external device as a power source to charge the battery of the external device.

Exemplary embodiments of the present general inventive concept can also provide a method of controlling a computer system, the method including connecting an external device to the computer system with a connector, and selectively connecting a system unit of the computer system to communicate data with the external device, or a recognition signal generator of the computer system to generate a signal to initiate charging of a battery of the external device with a switching unit.

The method may also include electrically disconnecting the system unit from the connector so that data is not transmitted to between the system unit and the external device when the system unit is powered off, and electrically connecting the system unit to the connector when the system unit is powered on and the external device is connected to the computer system.

The method may also include controlling power supplied from a power supply or a battery unit to the connected external device with a power supply controller when the system unit is powered off.

The method may also include where the signal generated by the recognition signal generator is recognized by the external device as a power source to charge the battery of the external device.

BRIEF DESCRIPTION OF THE DRAWINGS

The above and/or other utilities will become apparent and more readily appreciated from the following description of the exemplary embodiments, taken in conjunction with the accompanying drawings, in which.

DETAILED DESCRIPTION OF THE EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
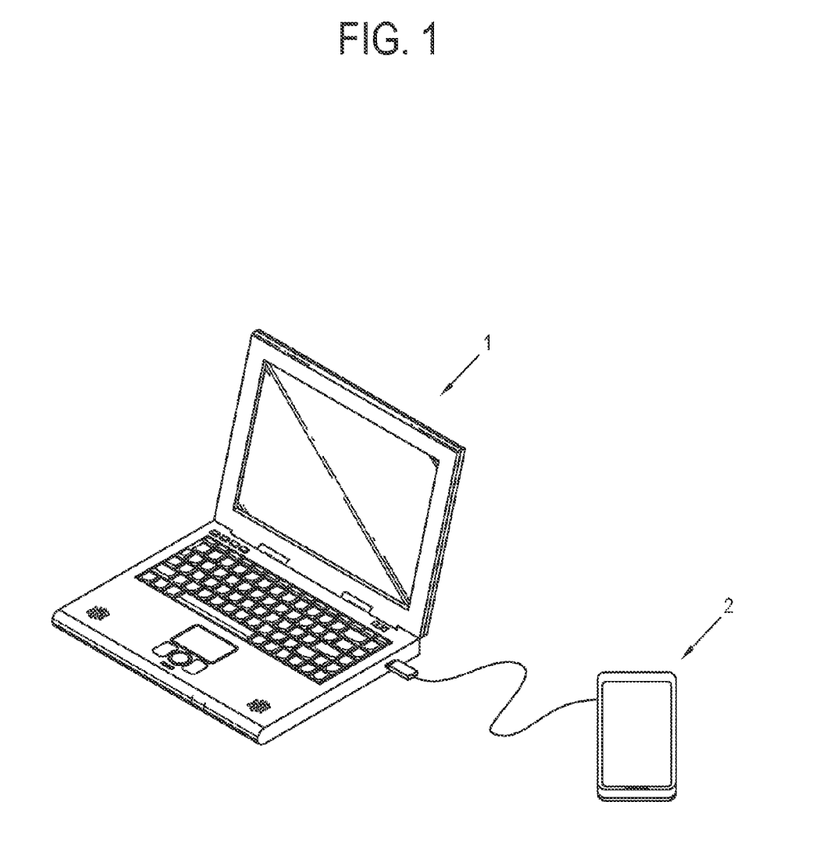
FIG. 1 illustrates a schematic view of a computer system and an external device having a rechargeable battery according to exemplary embodiments of the present general inventive concept.

FIG. 1 illustrates a schematic view of a computer system and an external device having a rechargeable battery according to exemplary embodiments of the present general inventive concept.

A computer system in exemplary embodiments of the present general inventive concept may include a personal computer (PC) such as a desktop computer, a laptop computer, a server, a workstation, etc. Alternatively, the computer system in the exemplary embodiments of the present general inventive concept may include any device which has operations that correspond to those of the PC, such as a smart book, a mobile Internet device (MID), a net book, a tablet computer, a smartphone, etc. as well as a general PC.

The computer system 1 according to exemplary embodiments of the present general inventive concept can include a central processing unit (CPU, not illustrated), a main memory (not illustrated), a memory controller hub (MCH, not illustrated), input/output controller hub (ICH, not illustrated), a graphic controller (not illustrated), a display unit (not illustrated), and peripheral devices (not illustrated), which are provided in a general computer system. The CPU, which can control the general operation of the computer system 1, can execute at least one computer program that is loaded into the main memory. The CPU can communicate with the MCH and the ICH in executing the at least one computer program, and can control them, respectively. The main memory can temporarily store data related to operation of the CPU together with the computer program executed by the CPU. For example, the main memory can be a volatile memory, which may be a double data rate synchronous dynamic random access memory (DDR SDRAM), etc. The graphic controller can process graphic data of an image displayed on a display unit. The peripheral device can include a plurality of hardware components including a hard disk drive, a solid state drive (SSD), a flash memory, a compact disc read only memory (CD-ROM), a digital versatile disc ROM (DVD)-ROM, a universal serial bus (USB) drive, a Bluetooth adapter, a modem, a network adapter, a sound card, a speaker, a microphone, a tablet, a touch screen, etc. The MCH can be an interface to write and/or read data between the main memory and other components of at least the computer system 1 such as the CPU or the like. The ICH can be an interface to communicate between the CPU and the peripheral devices. In exemplary embodiments of the present general inventive concept, a computer program executed by the CPU may include a basic input/output system (BIOS), an operating system, and one or more applications. In exemplary embodiments of the present general inventive concept, the BIOS may be stored in a BIOS ROM, i.e., a non-volatile memory (not illustrated), and the operating system and the application are stored in a hard disk drive or SSD by way of example.

The external device 2 may include any portable device having a rechargeable battery, such as a cellular phone, a MP3 player, a personal digital assistant (PDA), a Portable media player (PMP), a tablet computer, etc. For example, the external device 2 can include a built-in rechargeable battery such as a lithium-ion battery and can be driven by power of the rechargeable battery. An alternating current (AC) adapter or the like that may be included with the external device 2 may be used to charge the rechargeable battery with commercial power.

Figure 2:
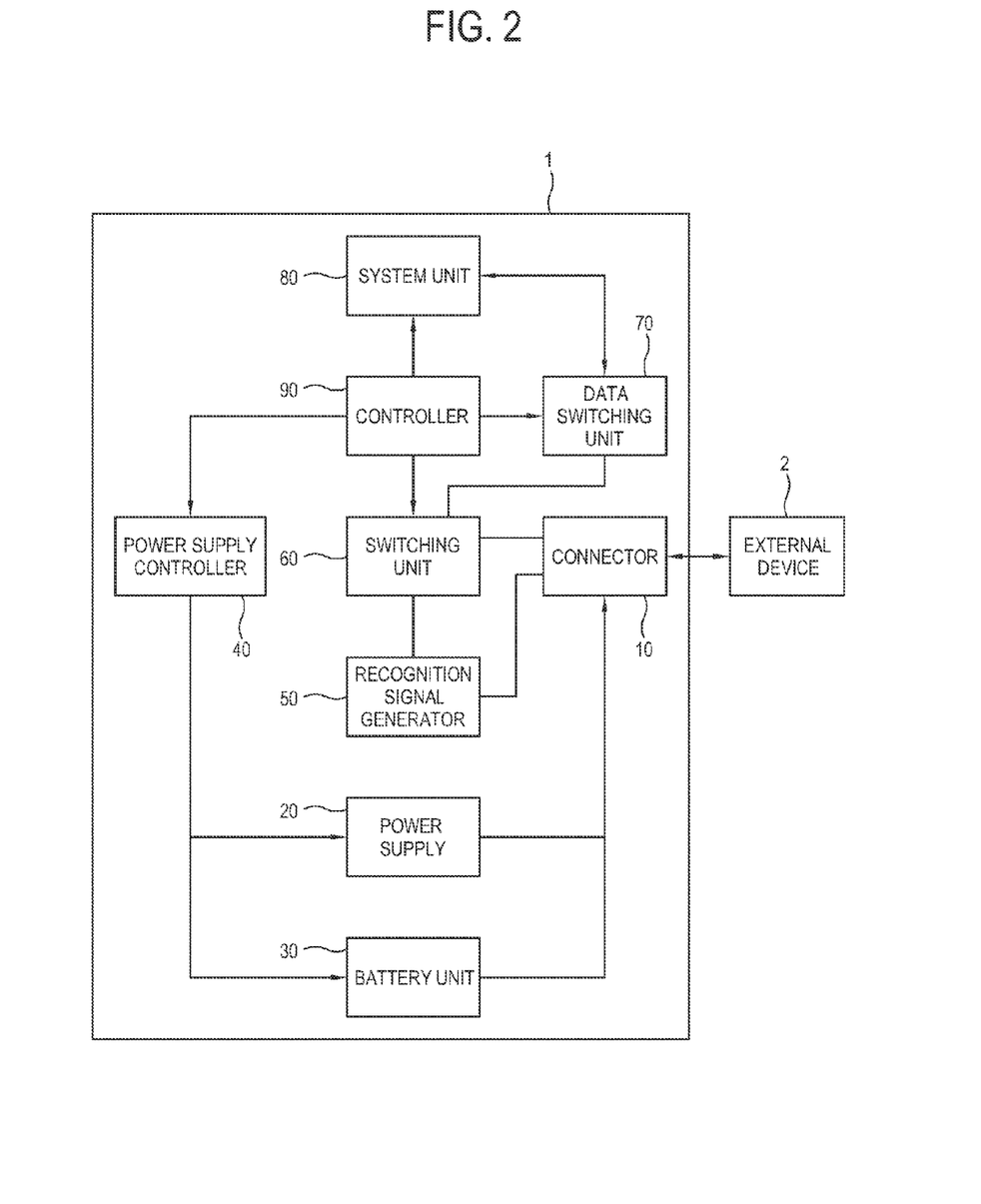
FIG. 2 illustrates a control block diagram of a computer system according to exemplary embodiments of the present general inventive concept.

FIG. 2 illustrates a control block diagram of a computer system according to exemplary embodiments of the present general inventive concept.

As illustrated therein, the computer system 1 according to exemplary embodiments of the present general inventive concept can include a connector 10, a power supply 20, a battery unit 30, a power supply controller 40, a recognition signal generator 50, a switching unit 60, a data switching unit 70, a system unit 80, and a controller 90 to control one or more of the aforementioned elements that may be included in the computer system 1.

The connector 10 can include a connection terminal to which the external device having the rechargeable battery can be connected. The connection terminal can include a power supply terminal (refer to 10a of FIG. 3) to supply power to the external device 2, and a data signal terminal (refer to 10b of FIG. 3) to communicate data between the external device 2 and the computer system 1. Any connector interface to connect the external device 2 and the computer system 1 may be provided in addition to the power supply terminal and the data signal terminal.

For example, the connector 10 may include a universal serial bus (USB) interface. If the connector 10 is the USB interface, the computer system 1 in exemplary embodiments of the present general inventive concept may include a USB controller (not illustrated). Thus, under control of the CPU 3, the USB controller can control data communication with the external device 2 connected through the USB interface.

If the connector includes the USB interface, a pair of data signal terminals can be provided to interactively transmit digital data between the external device 2 and the computer system 1, a power supply terminal to supply an electric current (e.g., a current of 0.5 A or less) to the external device 2, and a ground terminal.

The power supply 20 may supply power to the connector 10. The power supply 20 can supply power to the connector 10 or the like components of the computer system 1. The power supply 20 can convert commercial AC power input from the exterior into power adapted for the connector 10 or the like.

The battery unit 30 can have a predetermined battery capacity rechargeable with power, and can be charged with the power supplied from the power supply 20. The battery unit 30 can be an auxiliary power source to provide power to the power supply 20 and to supply power to the connector 10 and the components of the computer system 1.

The power supply 20 and the battery unit 30 may be selected to supply power to the connector 10 under control of the power supply controller 40. For example, the power supply controller 40 can control the power supply 20 to supply power when commercial AC power is supplied from the exterior, and the battery unit 30 to supply power when commercial AC power is not supplied from the exterior.

The power supply controller 40 may control the power supply 20 to supply predetermined power to the connector 10 even when the system unit 80 is powered off. When the power supply 20 receives no commercial AC power from the exterior, the power supply controller 40 may control the battery unit 30 to supply predetermined power to the connector 10 even when the system unit 80 is powered off.

The power supply controller 40 can be controlled by the controller 90 (to be described later). That is, under the control of the controller 90, the power supply controller 40 can control the power supply 20 or the battery unit 30 to supply predetermined power to the connector 10 even when the system unit 80 is powered off. The controller 90 can control the power supply controller 40 according to a user's setting. If a user sets power to be supplied to the connector 10 even when the system unit 80 is powered off, the controller 90 can correspondingly control the power supply controller 40 to supply a predetermined power to the connector 10.

The recognition signal generator 50 can generate a recognition signal to initiate charging the battery with the power supplied from the power supply 20 through the connector 10 if the external device 2 is connected to the connector 10 through the connecting terminal.

The recognition signal generator 50 may be connected to the data signal terminal to which the external device 2 can be connected and communicate a data signal with the system unit 80, which will be described in more detail.

The switching unit 60 can selectively connect the connector 10 to either of the recognition signal generator 50 or the data switching unit 70 and the system unit 80. The switching unit 60 can be controlled by the controller 90.

The data switching unit 70 can control a connection between the connector 10 and the system unit 80. Under the control of the controller 90, the data switching unit 70 can electrically disconnect the connector 10 and the system unit 80 from each other when the system unit 80 is powered off, so that a data signal may not be transmitted between the system unit 80 and the external device 2 connected to the connector 10. The data switching unit 70 can electrically connect the connector 10 and the system unit 80 with each other when the system unit 80 is powered on, so that a data signal can be transmitted between the system unit 80 and the external device 2 connected to the connector 10.

The system unit 80 can perform an operation related to a predetermined function that can be provided by the computer system 1 to a user. For example, the system unit 80 may be a graphic controller (not illustrated), a peripheral device (not illustrated), a display unit (not illustrated), etc. The system unit 80 can receive operation power from the power supply 20 or the battery unit 30.

The controller 90 may control the switching unit 60 to selectively connect the connector 10 with either of the recognition signal generator 50 and the system unit 80 via the data switching unit 70. Thus, the controller 90 may control the switching unit 60 so that the connector 10 can be electrically connected to the recognition signal generator 50 when the system unit 80 is powered off.

The controller 90 may control the data switching unit 70 so that the connector 10 is electrically disconnected from the system unit 80 when the system unit 80 is powered off.

The controller 90 may be a CPU (not illustrated) of the computer system 1 according to exemplary embodiments of the present general inventive concept.

Figure 3:
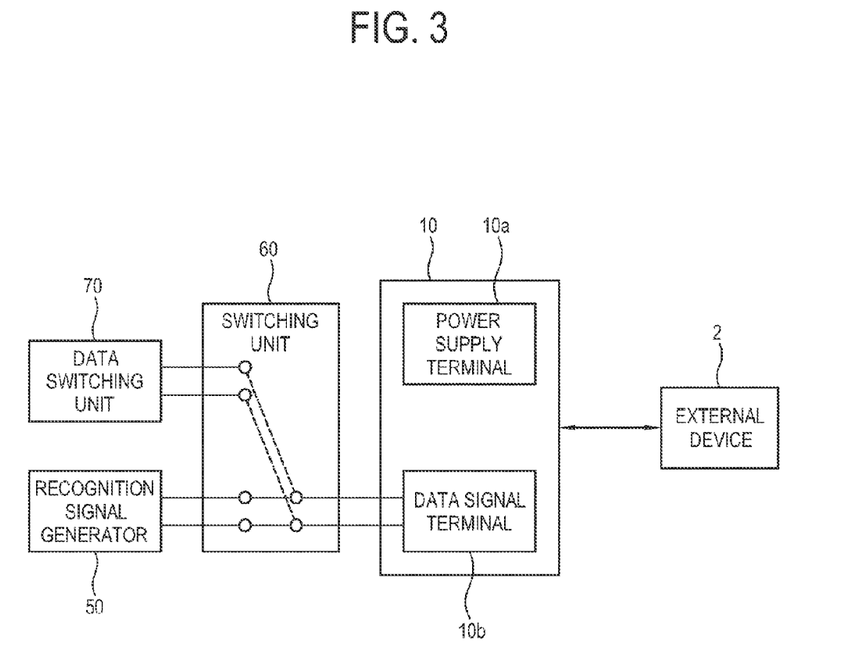
FIG. 3 illustrates a switching operation of a switching unit according to an exemplary embodiment.

FIG. 3 illustrates a switching operation of a switching unit according to exemplary embodiments of the present general inventive concept.

As illustrated therein, the connector 10 of the computer system 1 according to exemplary embodiments of the present general inventive concept can include the power supply terminal 10a and the data signal terminal 10b, through which the external device 2 having the rechargeable battery can be connected to the connector 10.

The data signal terminal 10b can include a pair of data signal lines through which the external device 2 can interactively and transmit (e.g., transmit serially) and/or receive a data signal to and/or from the system unit 80. The switching unit 60 can be electrically connected to the data signal terminal 10b, and can selectively connect the data signal terminal 10b with either of the recognition signal generator 50 or the data switching unit 70 under the control of the controller 90.

For example, if the system unit 80 is powered on, the switching unit 60 can electrically connect the data signal terminal 10b with the data switching unit 70 that is controlled by the controller 90. Thus, a data signal can be communicated between the external device 2 connected to the data signal terminal 10*b* and the system unit 80.

When the system unit 80 is powered off, the switching unit 60 can electrically connect the data signal terminal 10*b* with the recognition signal generator 50 that is controlled by the controller 90. Thus, communication of a data signal between the external device 2 connected to the connector 10 and the system unit 80 can be disabled. The recognition signal generator 50 can generate a recognition signal to initiate charging the battery of the external device 2 with power supplied from the power supply 20, and the external device 2 can recognize the generated recognition signal. At this time, the recognition signal can make the external device 2 recognize the powered-off system unit 80 as a commercial AC adapter dedicated to the external device 2, and it is initiated to charge the battery with power supplied from the power supply 20. As a precondition for initiating the charge of the battery, the controller 90 can control the power supply controller 40 to supply predetermined power from the power supply 20 to the connector 10 when the computer system 1 receives commercial AC power from the exterior, or to supply predetermined power from the battery unit 30 to the connector 10 when the computer system 1 receives no commercial AC power from the exterior.

The connector 10 with the USB interface will be described below.

The USB interface can include the power supply terminal, the ground terminal, and a pair of data signal terminals for communication of a data signal. In general, portable devices can include a USB interface to communicate with another electronic device, and the portable device can be connected to a dedicated AC adaptor or the electronic device having the USB interface to charge the battery provided in the portable device with power. The USB interface can allow a predetermined current (e.g., limited current) for data communication between a personal computer and an external device. An electric current supplied from the personal computer is typically not enough to charge the battery of the external device connected through the USB interface. When an external device including a portable electronic device such as a cellular phone or the like is connected to the computer so as to charge the battery, a voltage drop can occur because of insufficient electric current supplied from the computer and a voltage level for charging the battery of the portable electronic device is unsatisfied, so that charging cannot be initiated. Accordingly, to minimize and/or prevent the battery of the external device from being not charged, a recent method has been developed to recognize the electronic device connected through the USB interface and thus control a charging current. For example, when an AC adapter is dedicated to the external device, as it provides an electric current to charge the external device, an electric current (e.g., a current of 1.5 A) can be provided so as to decrease the time spent charging. When the charging is performed when the external device is connected to a computer of the like, a reduced electric current (e.g., a current of 0.5 A) can be provided in to charge the external device and to minimize and/or prevent a voltage drop. When the external device is connected to an undedicated AC adapter or a powered-off computer, the battery of the external device may not be charged.

The recognition signal generator 50 in the exemplary embodiments of the present general inventive concept can be connected to a pair of data signal lines that are connected to the data signal terminal of the connector. The external device can recognize a predetermined recognition signal generated by the recognition signal generator and can initiate a charging of the battery thereof even when the computer system is powered off. That is, when the computer system is powered off, the computer system can generate a recognition signal such that the external device recognizes the computer system as its dedicated AC adapter so that the external device can initiate charging its battery.

Here, the recognition signal generator 50 may include a cost-effective passive element. The passive element may include at least one of a short resistor, a pull-down resistor, and a pull-up resistor. Regardless of whether the passive element connected to the data signal line forms a predetermined resistance or a predetermined voltage level, any passive element may be used to carry out the exemplary embodiments of the present general inventive concept to generate the recognition signal to be recognized by the external device as a dedicated AC adapter. The external device can recognize the powered-off computer system as the dedicated AC adapter when receiving a predetermined recognition signal generated by the passive element, so that the battery of the external device can be charged.

For example, the AC adapter dedicated to the external device 2 having the rechargeable battery can have a voltage difference of 0.2-1.0V between D+/D− at 2.5-3.0V. In this case, the recognition signal generator (e.g., a passive element) that generates a voltage difference of 0.2-1.0V between D+/D− can be connected to the pair of data signal lines connected to the data signal terminal of the connector of the computer system. When the system unit of the computer system is powered off, if the external device 2 is connected to the computer system through the connector, it can initiate charging the battery thereof since the voltage difference generated by the recognition signal generator is the same as that of its own dedicated AC adapter. The battery can be charged with an electric current of 1.5V as if it is charged by the dedicated AC adapter, so that the charging can be completed within a predetermined amount of time.

Further, a recognition signal generator may be provided with a resistor of 2000 between the pair of data signal lines connected to the data signal terminal of the connector of the computer system. The external device 2 having a battery that meets a predetermined battery charger specification (e.g., a battery charger (BC) specification of version 1.1) can recognize the recognition signal as its own dedicated AC adapter and initiate charging the battery.

Figure 4:
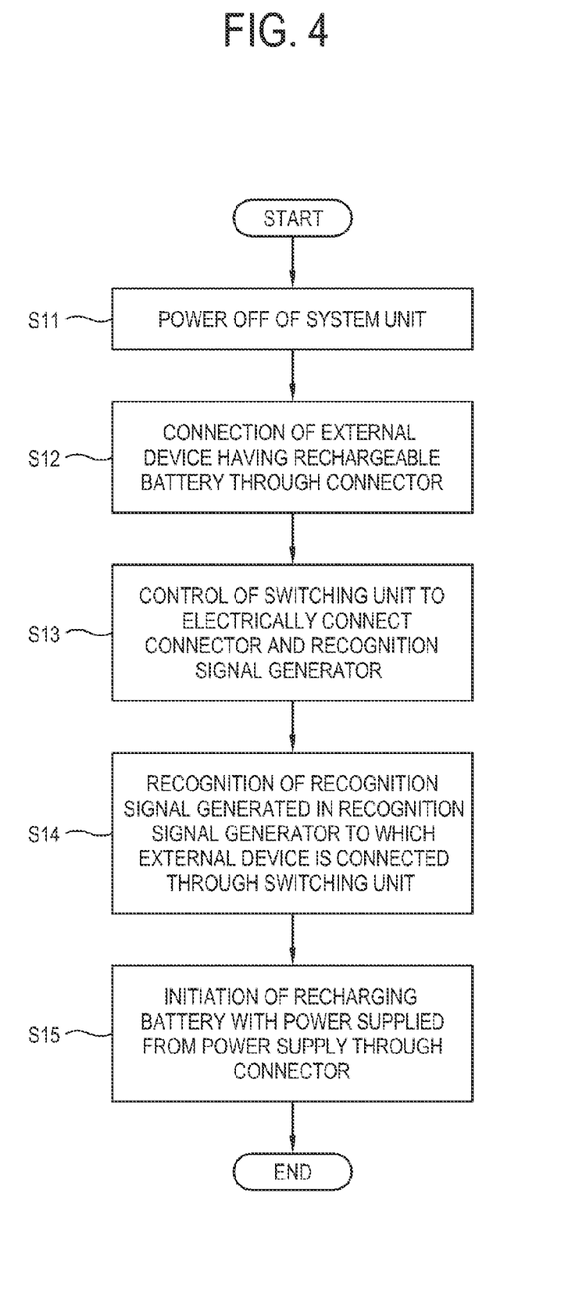
FIG. 4 is a control flowchart illustrating an operation of the computer system according to exemplary embodiments of the present general inventive concept.

FIG. 4 is a control flowchart illustrating an operation of the computer system according to exemplary embodiments of the present general inventive concept.

If the system unit 80 of the computer system 1 is powered off at operation S11, and the external device 2 having a rechargeable battery is connected through the connector 10 at operation S12, the controller 90 can control the switching unit 60 to selectively connect the connector 10 with either of the recognition signal generator 50 or the system unit 80, for example, to control the switching unit 60 to electrically connect the connector 10 with the recognition signal generator 50 at operation S13. The recognition signal generator 50 can generate a predetermined recognition signal to initiate charging the battery of the external device 2, and thus the external device 2 can receive the generated recognition signal at operation S14. With this, the battery of the external device 2 can be charged with power supplied from the power supply 20 through the connector 10 at operation S15.

In the operation S13, the controller 90 may control the data switching unit 70 to control the connection between the connector 10 and the system unit 80. The control of the data switching unit 70 can disconnect the connector 10 from the system unit 80 when the system unit 80 is powered off.

The power supply 20 may be controlled to supply predetermined power to the connector 10 even though the system unit 80 is powered off.

In the operation S14, if no external power is supplied to the power supply 20, a predetermined recognition signal may be generated to charge the battery of the external device 2 with power supplied from the battery unit 30. Even though the system unit is powered off, the battery unit 30 may be further controlled to supply predetermined power to the connector 10.

The connector 10 may include the USB interface.

As described above, the exemplary embodiments of the present general inventive concept provide convenience for a user as a rechargeable battery of an external device can be charged even when a computer system is not only powered on, but also powered off.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several exemplary embodiments have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A computer system comprising:
 a connector including a terminal to which an external device is connected, the connector comprising:
  a power supply line to connect the external device including a rechargeable battery; and
  a data signal line to transmit and receive data signals between the external device and the computer system;
 a power supply to supply power to the power supply line of the connector, where the power corresponds to a charge current having one of a first level and a second level which is higher than the first level; and
 a recognition signal generator to generate a predetermined recognition signal to initiate charging a rechargeable battery of the external device with the power supplied from the power supply corresponding to the charge current of the second level through the power supply line of the connector when the external device is connected to the connector,
 wherein the generated predetermined recognition signal is outputted through the data signal line, and is different from the data signals in a voltage level.

2. The computer system according to claim 1, further comprising:
 a system unit;
 a switching unit to selectively connect the connector to one of the recognition signal generator and the system unit; and
 a controller to control the switching unit.

3. The computer system according to claim 2, wherein the controller controls the switching unit to electrically connect the connector with the recognition signal generator when the system unit is powered off.

4. The computer system according to claim 2, further comprising:
 a data switching unit to control a connection between the connector and the system unit,
 wherein the controller controls the data switching unit to electrically disconnect the connector from the system unit when the system unit is powered off.

5. The computer system according to claim 1, wherein the connector comprises:
 a universal serial bus (USB) interface.

6. The computer system according to claim 5, wherein the terminal of the connector comprises:
 a data signal terminal to which the external device is connected via the data signal line to communicate a data signal with the system unit, and
 the recognition signal generator is connected to the data signal terminal.

7. The computer system according to claim 3, further comprising:
 a power supply controller to control the power supply to supply predetermined power to the connector even when the system unit is powered off.

8. The computer system according to claim 1, further comprising:
 a battery unit to supply power to the connector,
 wherein the recognition signal generator generates a predetermined recognition signal to initiate charging the battery with power supplied from the battery unit when no external power is supplied to the power supply.

9. The computer system according to claim 8, further comprising:
 a system unit; and
 a power supply controller to control the battery unit to supply predetermined power to the connector even when the system unit is powered off.

10. A computer system, comprising:
 a connector to connect an external device to the computer system, the connector comprising:
  a power supply line to connect the external device including a rechargeable battery; and
  a data signal line to transmit and receive data signals between the external device and the computer system; and
 a switching unit to selectively connect a system unit of the computer system to communicate data with the external device via the data signal line, or a recognition signal generator of the computer system to generate a signal to initiate charging of the rechargeable battery of the external device with a power supplied to the power supply line of the connector, the power corresponding to a charge current having one of a first level and a second level which is higher than the first level, and where the charging of the rechargeable battery is with the power that corresponds to the change current of the second level, and where the generated signal is outputted through the data signal line, and is different from the data signals in a voltage level.

11. The computer system of claim 10, wherein the switching unit electrically disconnects the system unit from the connector so that data is not transmitted to between the system unit and the external device when the system unit is powered off, and electrically connects the system unit to the connector when the system unit is powered on and the external device is connected to the computer system.

12. The computer system of claim 11, further comprising:
a power supply controller to supply power from a power supply or a battery unit to the connected external device when the system unit is powered off.

13. The computer system of claim 10, wherein the signal generated by the recognition signal generator is recognized by the external device as a power source to charge the rechargeable battery of the external device.

14. The computer system according to claim 1, wherein the recognition signal generator generates the predetermine recognition signal such that the external device recognizes a voltage difference of the data signal line to charge the external device based on the predetermined recognition signal.

15. The computer system according to claim 14, wherein the voltage difference of the data signal line between D+ and D− is 0.2 to 1.0[V].

16. The computer system according to claim 14, wherein the recognition signal generator generates the voltage difference of the data signal line comprising a pair of data signal lines between D+ and D− being 0.2 to 1.0[V].

17. The computer system according to claim 1, wherein a voltage difference of the data signal line is the same voltage difference as that of an alternating current (AC) adapter.

18. The computer system according to claim 17, wherein the recognition signal generator comprises a passive element for the external device to recognize the voltage difference of the data signal as that of the AC adapter.

19. The computer system according to claim 18, wherein the passive element comprises at least one of a short resistor, a pull-down resistor, and a pull-up resistor.

20. The computer system according to claim 1, wherein a charge current of a normal charge mode is 0.5 [A] and a charge current of a high-speed charge mode is 1.5 [A].

* * * * *

UNITED STATES PATENT AND TRADEMARK OFFICE
CERTIFICATE OF CORRECTION

PATENT NO. : 8,941,361 B2  
APPLICATION NO. : 12/974374  
DATED : January 27, 2015  
INVENTOR(S) : Seung-min Bae Page 1 of 1

It is certified that error appears in the above-identified patent and that said Letters Patent is hereby corrected as shown below:

In the Claims

Claim 10, Column 10, line 65, delete "and where" and insert --where-- therefor.

Signed and Sealed this  
Seventh Day of July, 2015

Michelle K. Lee  
*Director of the United States Patent and Trademark Office*